United States Patent [19]

Seymour

[11] Patent Number: 5,743,558
[45] Date of Patent: Apr. 28, 1998

[54] AIR CUSHION MODULE WITH ROTATING VENT RING

[75] Inventor: Brian T. Seymour, Bloomfield, Mich.

[73] Assignee: Takata, Inc., Auburn Hills, Mich.

[21] Appl. No.: 799,695

[22] Filed: Feb. 11, 1997

[51] Int. Cl.⁶ .................................................. B60R 21/28
[52] U.S. Cl. ................................. 280/739; 280/731
[58] Field of Search ............................ 280/738, 739, 280/731, 736, 742

[56] References Cited

U.S. PATENT DOCUMENTS

| | | |
|---|---|---|
| Re. 34,204 | 3/1993 | Takada . |
| 4,500,114 | 2/1985 | Grey, Jr. . |
| 4,805,930 | 2/1989 | Takada . |
| 4,877,264 | 10/1989 | Cuevas . |
| 5,007,662 | 4/1991 | Abramczyk et al. . |
| 5,016,913 | 5/1991 | Nakajima et al. . |
| 5,018,761 | 5/1991 | Henseler . |
| 5,071,161 | 12/1991 | Mahon et al. . |
| 5,226,670 | 7/1993 | Wright et al. . |
| 5,310,215 | 5/1994 | Wallner . |
| 5,330,226 | 7/1994 | Gentry et al. . |
| 5,366,242 | 11/1994 | Faigle et al. . |

Primary Examiner—Eric D. Culbreth
Attorney, Agent, or Firm—Harness, Dickey & Pierce, P.L.C.

[57] ABSTRACT

An occupant restraint system composed of a compact air cushion module containing a rotating vent ring which creates a variable venting system for inflation of an air cushion. The rotating vent ring moves to open one or more vents of different flow areas which allows inflation gas to vent to the atmosphere thereby controlling the pressure with which the inflatable air cushion fills. The rotating vent ring has a neutral or non-rotated position wherein the venting is minimized such that the inflatable air cushion fills with a maximum pressure. The rotating vent ring is rotated to a variety of positions in response to one or more changing environmental conditions within the vehicle. Such conditions may include occupant position, seat belt usage, occupant weight, ambient temperature or any other relevant environmental factor.

10 Claims, 6 Drawing Sheets

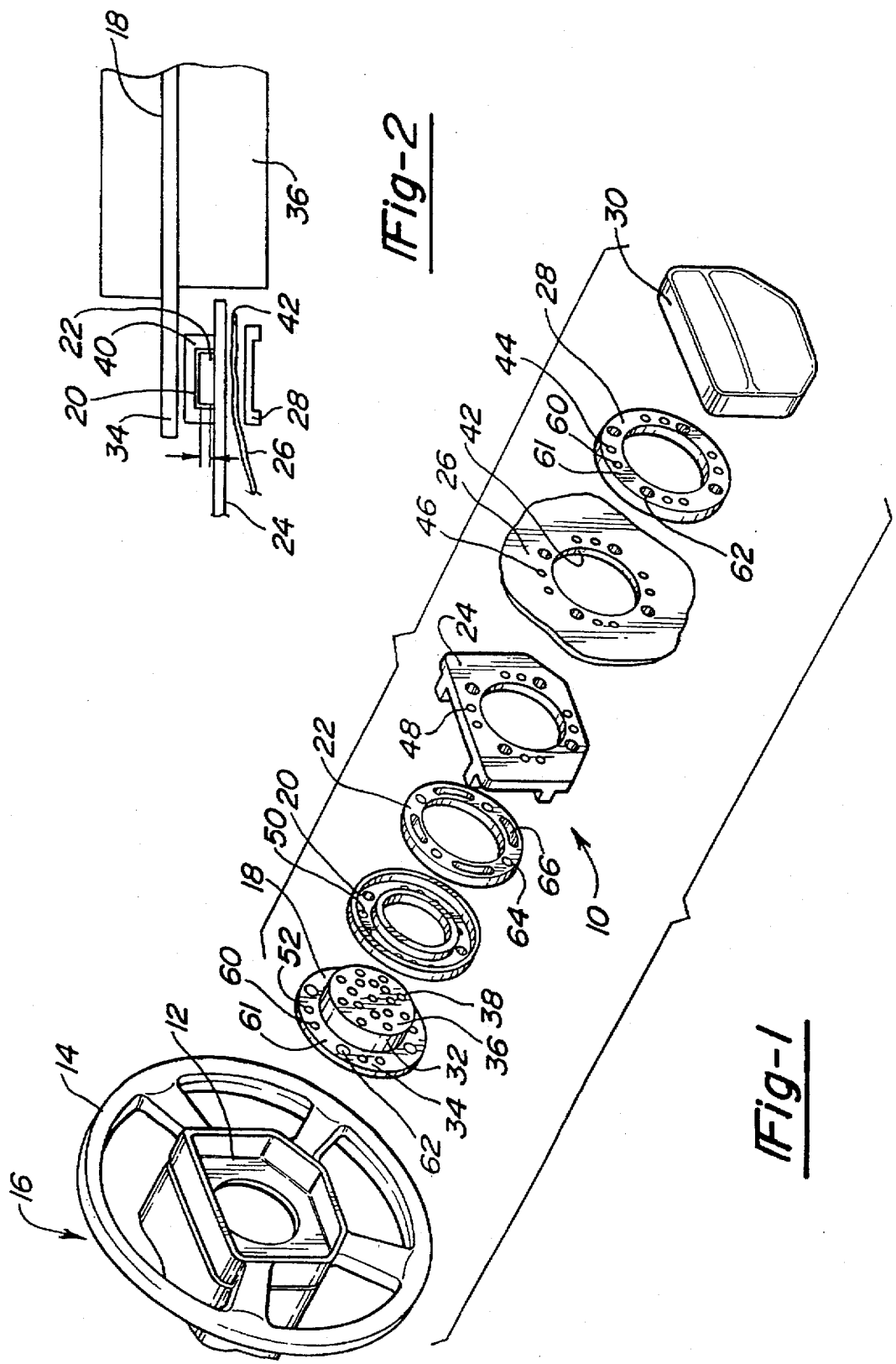

AIR CUSHION MODULE WITH ROTATING VENT RING

FIELD OF THE INVENTION

The present invention relates to an occupant restraint system which provides protection for occupants of a motor vehicle in the event of a vehicle impact, and more particularly, to an air cushion module having a rotating vent ring for variably venting inflation gases during deployment in order to compensate for changing environmental factors.

BACKGROUND OF THE INVENTION

Motor vehicle occupant restraint systems are known to include an air cushion module with an inflator for generating, or storing, non-combustible gas and an inflatable air cushion. The inflator and the air cushion are generally fastened together with a base plate being mounted between the two components to provide a mounting support for fastening the air cushion module to the vehicle. If the air cushion module is intended to protect the driver of the vehicle, the module would generally be mounted in the steering wheel hub of the motor vehicle. Once installed, the module having the air cushion folded within it is covered by a trim cover which includes a split line.

Deployment of the air cushion module is triggered by crash sensors which detect the vehicle deceleration which occurs during the impact. Deployment begins when the sensors send a signal to the inflator causing it to generate or release the inflation gases. As the inflation gas leaves the inflator and enters the air cushion, the air cushion expands and the trim cover splits open in a controlled fashion along a split line. Once deployed, the air cushion restrains the occupant by absorbing the occupant's kinetic energy, thereby preventing the occupant from striking structural components of the vehicle.

While it is recognized that such air cushion modules provide excellent protection for motor vehicle occupants, designers of these devices continually strive to improve the performance of the air cushion modules and better protect the occupants.

The performance of the air cushion modules can be affected by variations in environmental conditions. The environmental conditions include not only ambient temperature but also the occupant position, seat belt usage, and occupant size. By modulating the inflation of the air cushion as a function of these conditions the system is allowed to operate in a manner best suited for a variety of operating conditions. Altering the pressure of the inflation gas in the air cushion is one way of allowing for such variability.

Air cushion modules are presently known which incorporate adaptive inflation features. One approach is to utilize inflators which release gas at varying levels of rate of discharge or volume, these levels being determined by an electronic controller. However, these systems may be expensive, bulky, and are generally capable of providing only two discrete inflation levels. Another approach incorporates a variable venting mechanism in which air cushion vent passages have a variable area through which the inflation gas within the bag can escape. However, there is a continuing need to provide alternate forms of adaptive air cushion modules to allow greater design flexibility for the automotive designers. Particularly, air cushions having ease of assembly and manufacture, and the ability to be packaged in confined areas, such as a steering wheel hub, are important contributions to the field.

SUMMARY OF THE INVENTION

An air cushion module made in accordance with the teachings of the present invention provides a compact module incorporating a variable inflation feature which allows the deployment of the air cushion to be altered in response to variations in one or more environmental conditions. The module includes as rotatable vent ring encircling the inflator. The vent ring can be selectively rotated to align vent apertures within the vent ring with coordinated vent apertures located in the cushion mouth, the base plate, a vent spacer ring, and an inflator flange. By selectively rotating the vent ring to align with the coordinated vent apertures the inflation gas is vented to the atmosphere, thereby altering the pressure of the inflation gases within the air cushion. The vent ring in a neutral or non-rotated position is not aligned with the coordinated vent apertures thereby providing a maximum inflation pressure and rate for the air cushion. From the neutral position, the vent ring can be rotated by a number of methods to a variety of positions such that a varying amount of inflation gas is allowed to pass to the atmosphere thereby providing a varying rate or volume of gas to inflate the air cushion.

The position of the vent ring rotation is determined by monitoring one or more environmental or other conditions and adapting the vent rate of the gases to best coordinate with the changing conditions. The vent rates, and rotation of the vent ring, can be in discrete increments or can be infinitely variable.

These and other benefits, features, and advantages of the present invention will become apparent from a reading of the following detailed description of the preferred embodiments when taken in conjunction with the accompanying drawings and appended claims.

BRIEF DESCRIPTION OF THE DRAWINGS

FIG. 1 is an exploded view of a driver side air cushion module made in accordance with the teachings of the present invention;

FIG. 2 is a partial cross-sectional view of an air cushion module according to the present invention;

DETAILED DESCRIPTION OF THE PREFERRED EMBODIMENTS

Figure 3:
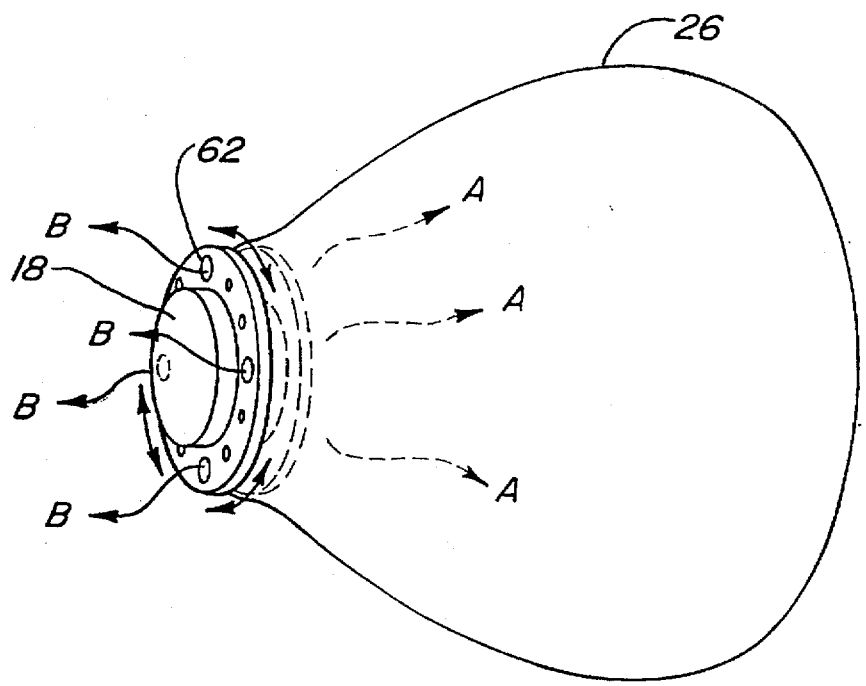
FIG. 3 is a perspective view of a deployed air cushion module incorporating the teachings of the present invention.

FIG. 1 shows an exploded view of a driver side air cushion module 10 made in accordance with the teachings of the present invention. Module 10 is mounted within hub 12 of steering wheel 14 which is a portion of steering column assembly 16. Included within module 10 is inflator 18, vent spacer ring 20, rotatable vent ring 22, base plate 24, air cushion 26, cushion ring 28, and trim cover 30.

Referring to FIGS. 1 and 2, it is shown that in the preferred embodiment, inflator 18 is comprised of a cylindrical portion 32 having a radially extending annular inflator flange 34. Inflator 18 has a nozzle 36 which includes a plurality of passages 38 through which inflation gases are directed during the deployment of air cushion 26.

Vent spacer ring 20 is positioned against inflator flange 34 and has a generally U-channel configuration which accepts rotating vent ring 22 therein. The side legs 40 of the U-channel are greater in length than the thickness, T, of rotating vent ring 22 so as to provide clearance between vent ring 22 and base plate 24 thus allowing ring 22 to rotate when module 10 is assembled.

Air cushion 26 is mounted to base plate 24 by a cushion ring 28 such that the cushion mouth 42 is generally aligned with and passes over nozzle 36 of inflator 18. A series of fastener holes 44, 46, 48, 50, and 52, are coordinated through cushion ring 28, cushion 26, base plate 24, spacer ring 20, and inflator flange 34, respectively. The preferred embodiment utilizes four equally spaced fasteners (not shown) to hold module 10 together. While vent ring 22 and spacer ring 20 are shown to be positioned outside of cushion 26, it is recognized that vent ring 22 and spacer ring 20 can also be located within cushion 26 if desired or beneficial to the particular design application.

Figure 4:
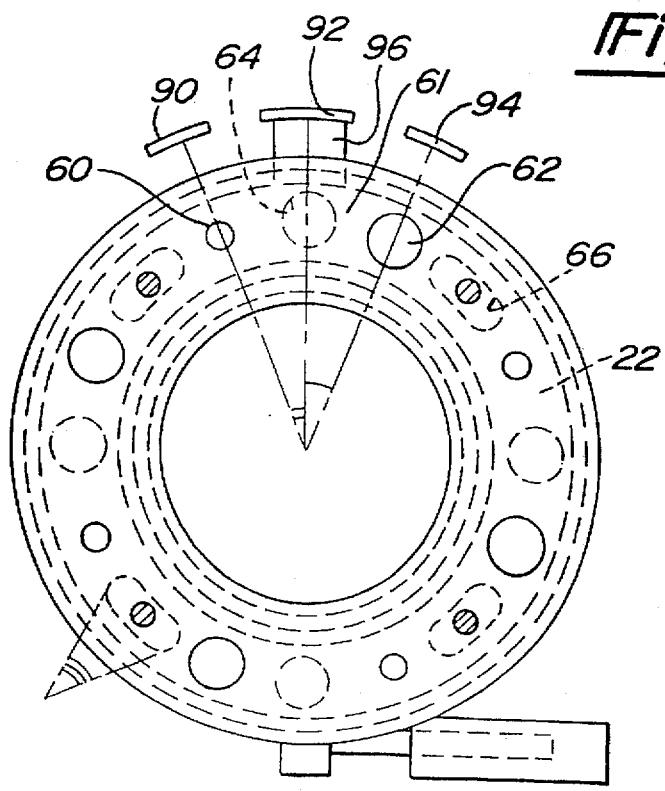
FIG. 4 is a rear view of a driver side air cushion module made in accordance with the teachings of the present invention, particularly showing the vent aperture patterns of the present invention.
Figure 5:
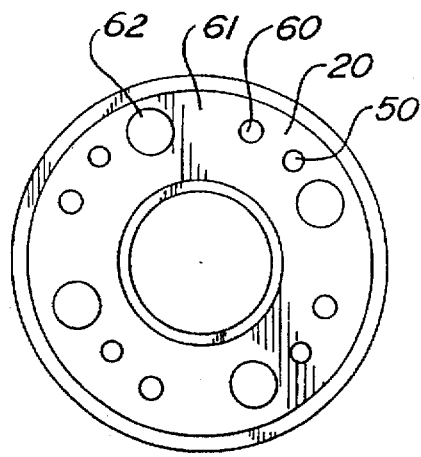
FIG. 5 is a front view of the components of the present invention having a pattern of coordinated vent apertures.
Figure 6:
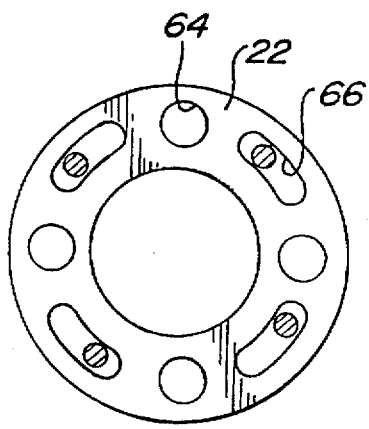
FIG. 6 is a front view of the vent ring of the present invention having a pattern of venting apertures and a set of radially arced slots providing clearance to fasteners of the air cushion module.

Referring now to FIGS. 4, 5, and 6, a series of coordinated vent apertures are provided in ring 28, cushion 26, base plate 24, spacer ring 20, and inflator flange 34. As shown in FIG. 5, the coordinated vent apertures of the preferred embodiment includes two sets of coordinated vent apertures 60 and 62. Spacer ring 20 is shown as representative of the other components 28, 26, 24, and 34. The first set of coordinated vent apertures 60 are a small diameter relative to the second set of coordinated vent apertures 62. Also included in the preferred embodiment are shutter portions 61, located between vent apertures 60 and 62. Shutter portions 61 do not have any holes at all but instead are intended to provide little or no venting area. The embodiment shown includes four apertures in each set of coordinated vent apertures 60 and 62, but a greater or lesser number may be used depending upon design needs and testing.

Referring to FIG. 6, vent ring 22 is shown to include a set of venting apertures 64 and a set of radially arced slots 66. Venting apertures 64 are generally equal to or larger than large coordinated vent apertures 62, and slots 66 are coordinated to align with fastener holes 44 through 52. Slots 66 within rotating vent ring 22 provide clearance to the fasteners used to hold module 10 as an assembly. The slots 66 allow ring 22 to move through an angular range and limit the extent of the range of rotational motion of ring 22. While the preferred embodiment depicts slots 66 as being located at the same radial distance as venting apertures 64, the slots 66 may be located radially inward or outward from the venting apertures 64 depending upon the exact configuration and use of air cushion module 10.

During operation of the vehicle, vent ring 22 of the preferred embodiment may be rotated to any of three positions. A first relatively rotated position is where venting apertures 64 are not aligned with either small coordinated vent apertures 60 or with large coordinated vent apertures 62 but instead are aligned with shutter portions 61. This position is shown in FIG. 4. In the first relatively rotated position the inflation gas generated by inflator 18 is provided with little or no venting to atmosphere other than that which is normally provided with air cushion 26. In the preferred embodiment, air cushion 26 is made of a porous material which allows some venting of the inflation gases during deployment; however, vent slots or holes may be incorporated within cushion 26 as is known in the art. Air cushion 26 can also be made of a non-porous or coated material which does not provide venting. In this type of construction some or all of the venting may be done by way of venting apertures 64 and a set of coordinated vent apertures. Vent ring 22 can be rotated counterclockwise in FIG. 4 to a second position wherein venting apertures 64 are aligned with small coordinated vent apertures 60, allowing a portion of the inflation gas to vent to atmosphere through the venting area provided thereby decreasing the pressure of the inflation gas within air cushion 26 upon deployment. Alternately, vent ring 22 may be rotated clockwise in FIG. 4 to a third position wherein venting apertures 64 are aligned with large coordinated vent apertures 62, allowing a greater amount of the inflation gas to vent to atmosphere through the larger vent area provided thereby achieving a still lower pressure of the inflation gas within air cushion 26 upon deployment.

FIG. 3 graphically depicts the flow of inflation gas when vent ring 22 (not shown for clarity) is in its third position whereby the venting apertures 64 (not shown) are aligned with the large coordinated vent apertures 62. As shown by the dashed arrows A gas flows from inflator 18 into air cushion 26 while at the same time a portion of the inflator gas flows from air cushion 26 through the venting area provided by apertures 62 and venting apertures 64 to the atmosphere, as shown by solid arrows B.

Figure 7:
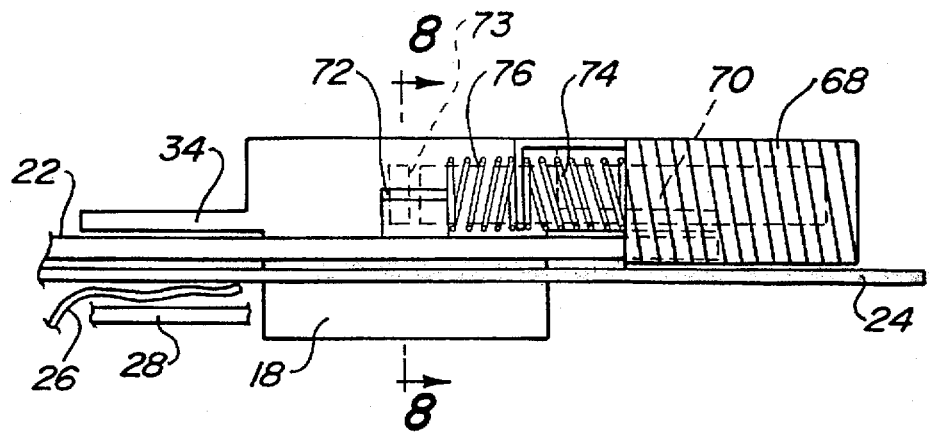
FIG. 7 is a partial cross-sectional view showing a toroidal electro-magnet and return springs in accordance with a preferred embodiment of the present invention.
Figure 8:
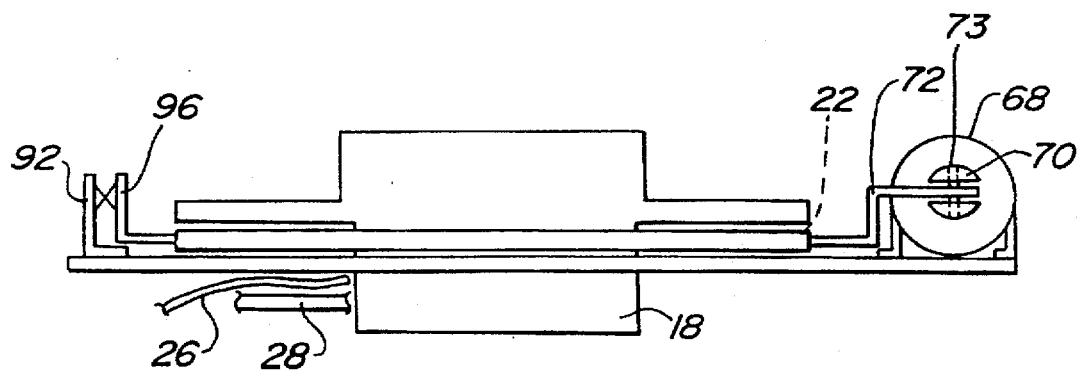
FIG. 8 is a cross-sectional view showing a location sensor according to the teachings of the present invention.

Air cushion module 10 of the present invention also includes a device for rotating vent ring 22 and a method of detecting the location of vent ring 22. One device for providing rotational movement of vent ring 22 is shown in FIGS. 7 and 8, wherein a toroidal electro-magnet 68 is mechanically connected to vent ring 22 by a through which extending from vent ring 22 passes. Passes pin 70 is pivotally connected to arm 72 by connector 73. In the first relatively rotated position, no current is provided to electro-magnet 68 and vent ring 22 is held in position by two return springs 74 and 76 which create oppositely acting forces, thereby generally retaining vent ring 22 in the first relatively rotated position. Vent ring 22 may be rotated to a second relatively rotated position by passing a current through electro-magnet 68 in a first direction which pulls pin 70 to the right, overcoming the force of return spring 74 and rotating vent ring 22. Alternately, vent ring 22 may be rotated to a third relatively rotated position by passing current through electro-magnet 68 in a second direction thereby forcing pin 70 to the left, overcoming the forces of return spring 76, and rotating vent ring 22 in an opposite direction.

Figure 9:
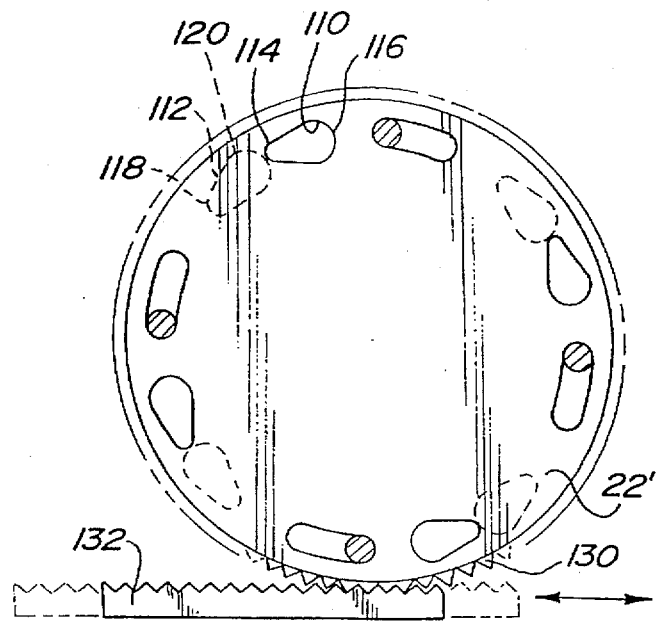
FIG. 9 is a front view of an alternate preferred embodiment of the present invention having slotted venting apertures and coordinated vent apertures.

An alternate device for rotating vent ring 22 is envisioned by the inventors to include a servo motor, or a stepper motor in place of the toroidal electro-magnet 68. Further, the inventors envision that a worm gear configuration can be utilized wherein vent ring 22 has a helical cut gear on a portion of its periphery allowing for driving engagement with a worm gear being driven by any rotational drive means currently available or later discovered. Alternately, as shown in FIG. 9, a linear drive means can be utilized in conjunction with a rack and pinion configuration wherein a portion of the outer perimeter of the vent ring 22 incorporates teeth 130 which meshingly engage a rack 132 moved side to side by the drive means in order to rotate the vent ring 22.

A variety of methods may be used to determine the relative rotational position of vent ring 22 of the present invention. Referring to FIGS. 4 and 8, the method incorporated in the preferred embodiment utilizes three location sensors 90, 92, and 94 which are angularly displaced from one another at a select angle. These angles are selected such that when venting apertures 64 are in the first relatively rotated position the contact arm 96 is in electrical contact with location sensor 92. A second position is obtained when the venting apertures 64 are rotated a specified distance and align with small coordinated vent apertures 60 at which point the contact arm 96 is aligned with a second location sensor 90 thereby indicating the counterclockwise rotation to the second relatively rotated position. A third position may also be obtained by rotating the vent ring 22 in a clockwise direction such that venting apertures 64 align with large coordinated vent apertures 62 and contact arm 96 aligns with a third location sensor 94 thereby indicating the rotation to the third relatively rotated position.

While the preferred embodiment of the present invention has been described as having three discrete positions of venting, it is envisioned by the inventors that an infinitely variable venting configuration can be utilized. As shown in FIG. 9, vent ring 22' may include an elongated slot 110 which is positioned to align with coordinated aperture slot 112 positioned in each of the components cushion ring 28', cushion 26', base plate 24', spacer ring 20', and inflator flange 34' (components not shown for clarity) of module 10'. Elongated slot 110 may have a small first end 114 and a larger second end 116, as shown, or may be uniform along its radial length. Coordinated aperture slot 112 may also have a small first end 118 and a larger second end 120, as shown, or may be uniform along its radial length. The configuration of slots 110 and 112 are dependant upon the control of and type of device used for rotating vent ring 22' as well as the extent of control required over the venting to provide proper protection for the changing environmental conditions.

Figure 10:
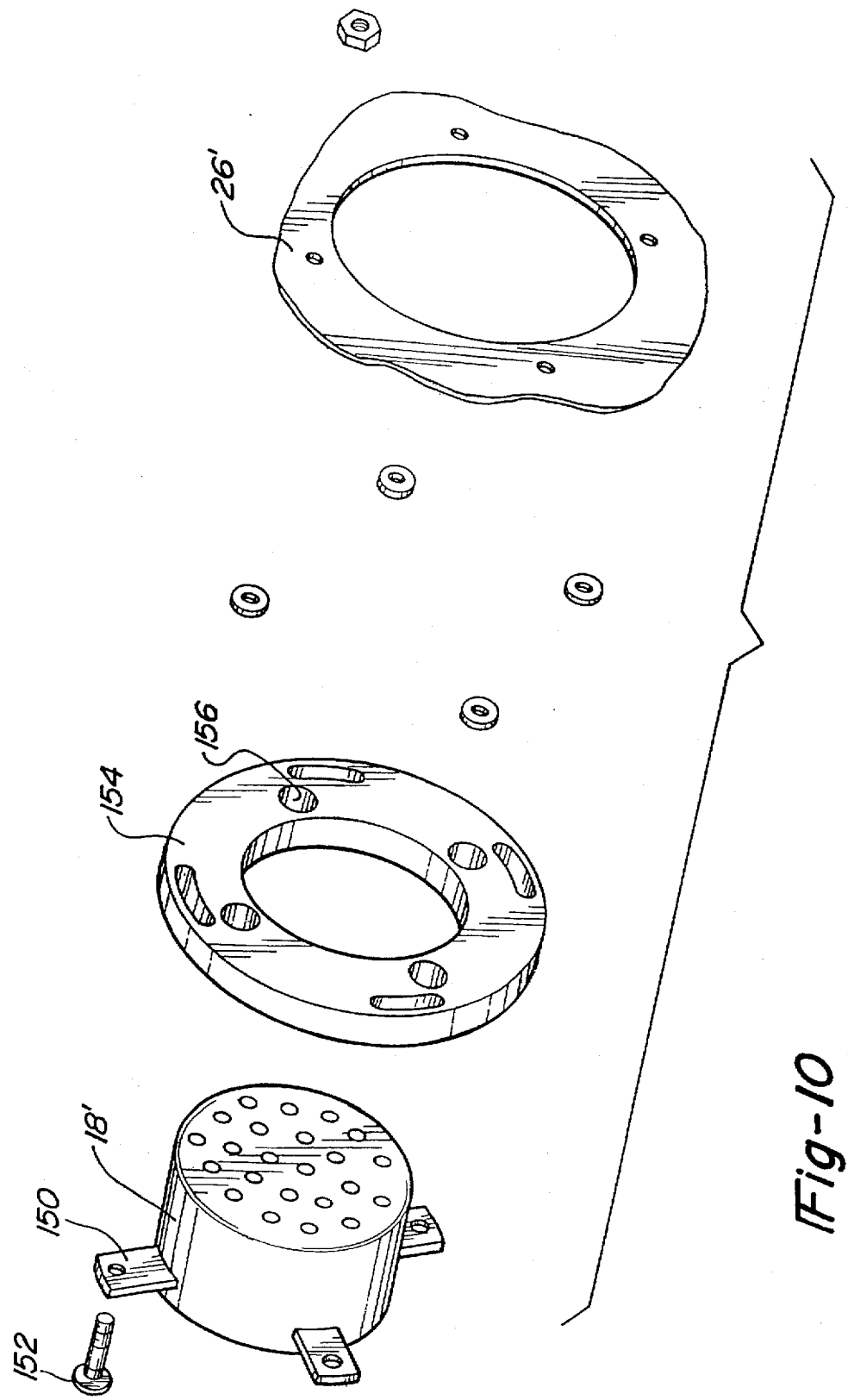
FIG. 10 is an exploded view of an alternate preferred embodiment of an air cushion module made in accordance with the teachings of the present invention.
Figure 11:
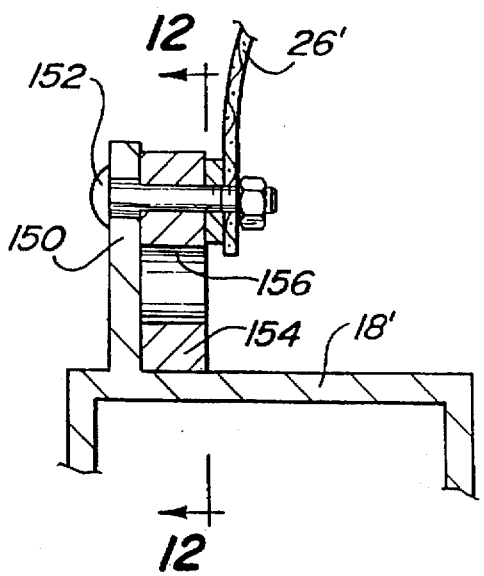
FIG. 11 is a partial cross-sectional view of an air cushion module shown in FIG. 10.
Figure 12:
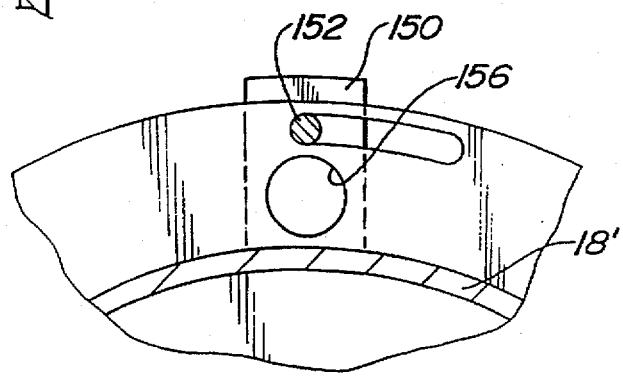
FIG. 12 is a sectional view of the air cushion module of FIG. 11 in a first relatively rotated position.
Figure 14:
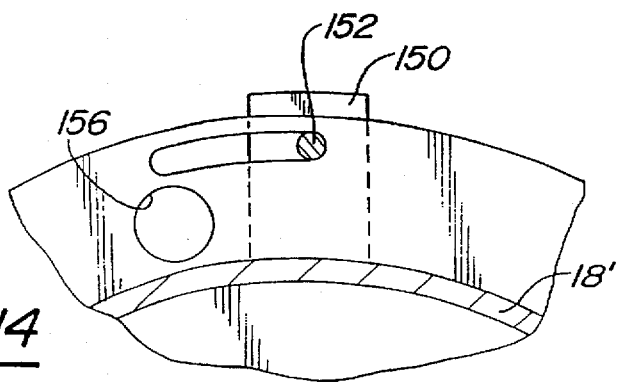
FIG. 14 is a sectional view of the air cushion module of FIG. 11 similar to FIG. 12 and in a third relatively rotated position.

An alternate preferred embodiment of the present invention is shown in FIGS. 10 and 11 wherein the generally cylindrical inflator 18' includes several radially extending flange portions acting as fastening projections 150 for attachment of the air cushion 26' to inflator 18'. The fasteners 152 used allow for a vent ring 154 to be rotatably retained. Vent ring 154 includes venting apertures 156 radially positioned to coordinate with fastening projections 150. This coordination allows the venting apertures 156 to be anywhere from fully overlapping, as shown in FIG. 12, to non-overlapping, as shown in FIG. 14, with the fastening projection 150 thereby allowing the venting of inflation gas to be varied depending upon the relative rotational position of the vent ring 154 relative to the fastening projection 150.

It should be noted that in this embodiment, and in the prior described embodiments, some venting of inflation gas may occur because of build tolerances or by design when the vent ring is in the most closed position for the venting apertures.

Figure 13:
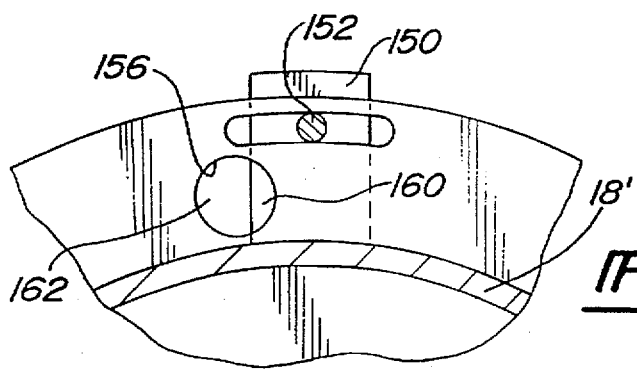
FIG. 13 is a sectional view of the air cushion module of FIG. 11 similar to FIG. 12 and in a second relatively rotated position.

The vent ring of the present embodiment may be rotated to a variety of positions depending on the changing environmental conditions. Three such positions are shown in FIGS. 12, 13, and 14, wherein: FIG. 12 is considered to be a most closed position wherein venting aperture 156 is generally aligned with fastening projection 150; FIG. 13 is an intermediate venting position wherein a first portion 160 of venting aperture 156 is aligned with fastening projection 150 while a second portion 162 is not aligned with projection 150 thereby allowing venting of inflation gas from air cushion 26'; and FIG. 14 is a fully open venting position wherein venting aperture 156 is not aligned with projection 150 and a larger relative venting area is provided. While Applicants have shown the venting aperture as being generally circular in the present embodiment, it is noted that a wide variety of apertures or series of apertures having differing shapes and venting areas can be used depending upon the design criteria for the particular air cushion and inflator used. Further, while FIG. 12 shows a "closed position" it is recognized that the closed position can by designed to allow for some venting of inflation gas and may be considered a low venting area position. The radially extending fastening projection 150 may also be adapted to incorporate apertures or a series of apertures of a wide variety of shapes and sizes to provide a wider range of variability in the venting of the inflation gas from the air cushion.

It is to be understood that while the invention has been described and illustrated in its preferred embodiments, various changes and modifications may be made without departing from the scope and fair spirit of the invention as defined in the following claims.

What is claimed is:

1. A compact variable venting air cushion module for a motor vehicle comprising:

a generally cylindrical inflator for providing inflation gas, said inflator having an annular flange extending therefrom;

an inflatable air cushion having a mouth for receiving inflation gas from said inflator;

a base plate for mounting said module to said vehicle;

said flange, said base plate, and said air cushion having a first set of coordinated vent apertures which are aligned, and a second set of coordinated vent apertures which are aligned;

a rotatably mounted vent ring being rotatable from a first relatively rotated position to a second relatively rotated position, said vent ring having venting apertures which align with said first set of coordinated vent apertures when said vent ring is in said first relatively rotated position thereby providing a first venting area, said venting apertures aligning with said second set of coordinated vent apertures when said vent ring is in said second relatively rotated position thereby providing a second venting area;

fasteners for connecting said air cushion, said base plate, said vent ring, and said inflator relative to one another; and a device for providing rotational movement of said vent ring, said device selectively rotating said vent ring from said first relatively rotated position to said second relatively rotated position.

2. The air cushion module of claim 1 wherein said first set of coordinated vent apertures has a first vent area, and said second set of coordinated vent apertures has a second vent area, said first vent area being different than said second vent area, whereby said inflation gas is allowed to vent to atmosphere at different rates thereby providing a different pressure within said air cushion during deployment.

3. The air cushion module of claim 1 further comprising a vent spacer ring having a first and second set of coordinated vent apertures aligned with said first and second set of coordinated vent apertures of said flange, said base plate, and said air cushion, said vent spacer ring having a generally U-shaped section with side legs longer than a thickness of said vent ring, said vent ring being coaxially mounted and rotatable within said vent spacer ring.

4. The air cushion module of claim 1 wherein said vent ring is mounted between said base plate and said flange.

5. The air cushion module of claim 1 wherein said vent ring includes a radially arced slot coordinated with each of said fasteners for connecting said air cushion, said base plate, said vent ring, and said inflator, said slots allowing rotational movement of said vent ring from said first relatively rotated position to said second relatively rotated position without interfering with said fasteners used to connect said air cushion, said base plate, said vent ring, and said inflator relative to one another.

6. The air cushion module of claim 1 wherein said device for providing rotational movement of said vent ring includes an electro-magnet mechanically connected to said vent ring and having a pin passing through said electro-magnet such that when a current is passed through said electro-magnet in a first direction said pin is urged in a first direction thereby rotating said vent ring to said first relatively rotated position, and such that when a current is passed through said electro-magnet in a second direction said pin is urged in a second direction thereby rotating said vent ring to said second relatively rotated position.

7. The air cushion module of claim 1 wherein said device for providing rotational movement of said vent ring is comprised of:

an electro-magnet mechanically connected to said vent ring by an arm;

a pin passing through said electro-magnet and being connected to said arm, said pin being movable in a first direction and a second direction;

a spring for forcing said pin in said first direction; and wherein when no current is passed through said electro-magnet said pin is urged in said first direction by said spring and said vent ring is rotated to said first relatively rotated position, and when a current is passed through said electro-magnet said pin is urged in said second direction such that the force of said spring is overcome and said vent ring is rotated to said second relatively rotated position.

8. A compact variable venting air cushion module for a vehicle, said air cushion module comprising:

a generally cylindrical inflator for providing inflation gas, said inflator having fastening projections radially extending therefrom;

a vent ring having venting apertures therein being rotatably mounted relative to said fastening projections, said venting apertures being radially positioned to coordinate with said fastening projections;

an inflatable air cushion having a mouth for receiving inflation gas from said inflator, said air cushion providing communication for said inflation gas to said venting apertures in said vent ring;

a device for providing rotational movement of said vent ring, said device selectively rotating said vent ring from a first relatively rotated position to a second relatively rotated position; and wherein said venting apertures of said vent ring are aligned with said fastening projections when said vent ring is in said first relatively rotated position thereby providing a first venting area, and said venting apertures of said vent ring are differently aligned with said fastening projections when said vent ring is in said second relatively rotated position thereby providing a second venting area, said first venting area being different than said second venting area.

9. The air module of claim 8 wherein said communication provided for said inflation gas to said venting apertures in said vent ring is through said mouth of said air cushion.

10. The air cushion module of claim 8 wherein said vent ring is mounted within said air cushion, said air cushion providing communication of said inflation gas to said venting apertures in said vent ring through said mouth of said air cushion.

* * * * *

UNITED STATES PATENT AND TRADEMARK OFFICE
CERTIFICATE OF CORRECTION

PATENT NO. : 5,743,558
DATED : April 28, 1998
INVENTOR(S) : Brian T. Seymour

It is certified that error appears in the above-indentified patent and that said Letters Patent is hereby corrected as shown below:

Column 4, line 49, after "22 by a", insert --pin 70--.

Column 4, line 49, after "through which", insert --an arm 72--.

Column 4, line 50, after "passes.", delete "Passes pin", and insert --Pin--.

Signed and Sealed this

Twenty-seventh Day of October, 1998

*Attest:*

BRUCE LEHMAN

*Attesting Officer*     *Commissioner of Patents and Trademarks*